United States Patent [19]

Sekhar

[11] Patent Number: 5,342,491

[45] Date of Patent: Aug. 30, 1994

[54] BONDING OF BODIES OF REFRACTORY HARD MATERIALS TO CARBONACEOUS SUPPORTS

[75] Inventor: Jainagesh A. Sekhar, Cincinnati, Ohio

[73] Assignee: Moltech Invent S.A., Luxembourg

[21] Appl. No.: 65,581

[22] Filed: May 21, 1993

Related U.S. Application Data

[62] Division of Ser. No. 28,359, Mar. 9, 1993.

[51] Int. Cl.$^5$ .................. C25C 3/06; C25B 11/12
[52] U.S. Cl. .................. 204/243 R; 204/279; 204/294
[58] Field of Search ............ 204/243 R, 279, 294

[56] References Cited

U.S. PATENT DOCUMENTS

| | | | |
|---|---|---|---|
| 4,093,524 | 6/1978 | Payne | 204/243 R |
| 4,333,813 | 6/1982 | Kaplan et al. | 204/243 R |
| 4,466,096 | 8/1984 | Boxall et al. | 204/294 |

Primary Examiner—John Niebling
Assistant Examiner—Kishor Mayekar
Attorney, Agent, or Firm—Frost & Jacobs

[57] ABSTRACT

Bodies (3) such as tiles, plates, slabs or bricks of Refractory Hard Material (RHM) or other refractory composites are bonded to the cathodes or to other components, in particular to a carbon cell bottom (1), of a cell for the production of aluminium by electrolysis of a cryolite-based molten electrolyte, made of carbonaceous or other electrically conductive refractory material, by a non-reactive colloidal slurry (4) comprising particulate preformed RHM in a colloidal carrier selected from colloidal alumina, colloidal yttria and colloidal ceria. The slurry usually comprises preformed particulate $TiB_2$ in colloidal alumina. The bodies (3) are usually $TiB_2$—$Al_2O_3$ composites. The bonding is achieved simply by applying the slurry and allowing it to dry.

16 Claims, 1 Drawing Sheet

BONDING OF BODIES OF REFRACTORY HARD MATERIALS TO CARBONACEOUS SUPPORTS

This is a divisional, of application Ser. No. 08/028,359, filed Mar. 9,1993.

Field of the Invention

The invention relates to methods of bonding bodies of Refractory Hard Material (RHM) or other refractory composites to the cathodes of cells for the production of aluminium by electrcolysis of alumina dissolved in a cryolite-based molten electrolyte, which cathodes are made of carbonaceous or other electrically conductive refractory materials. The invention also relates to such cells having bodies of RHM or refractory composites bonded to their cathodes, as well as the use of these cells for the production of a aluminium.

BACKGROUND OF THE INVENTION

Aluminium is produced conventionally by the Hall-Héoult process, process, by the electrolysis of alumina dissolved in cryolite-based molten electrolytes at temperatures up to around 950° C. A Half-Héroult reduction cell typically has a steel shell provided with an insulating lining of refractory material, which in turn has a lining of carbon which contacts the molten constituents. Conductor bars connected to the negative pole of a direct current source are embedded in the carbon cathode substrate forming the cell bottom floor. The cathode substrate is usually an anthracite based carbon lining made of prebaked cathode blocks, joined with a ramming mixture of anthracite, coke, and coal tar.

In Hall-Héroult cells, a molten aluminium pool acts as the cathode. The carbon lining or cathode material has a useful life of three to eight years, or even less under adverse conditions. The deterioration of the cathode bottom is due to erosion and penetration of electrolyte and liquid aluminium as well as intercalation of sodium, which causes swelling and deformation of the cathode carbon blocks and ramming mix. In addition, the penetration of sodium species and other ingredients of cryolite or air leads to the formation of toxic compounds including cyanides.

Difficulties in operation also arise from the accumulation of undissolved alumina sludge on the surface of the carbon cathode beneath the aluminium pool which forms insulating regions on the cell bottom. Penetration of cryolite and aluminium through the carbon body and the deformation of the cathode carbon blocks also cause displacement of such cathode blocks. Due to displacement of the cathode blocks, aluminium reaches the steel cathode conductor bars causing corrosion thereof leading to deterioration of the electrical contact, non uniformity in current distribution and an excessive iron content in the aluminium metal produced.

A major drawback of carbon as cathode material is that it is not wetted by aluminium. This necessitates maintaining a deep pool of aluminium (at least 100–250 mm thick) in order to ensure a certain protection of the carbon blocks and an effective contact over the cathode surface. But electromagnetic forces create waves in the molten aluminium and, to avoid short-circuiting with the anode, the anode-to-cathode distance (ACD) must be kept at a safe minimum value, usually 40 to 60 mm. For conventional cells, there is a minimum ACD below which the current efficiency drops drastically, due to short-circuiting between the aluminium pool and the anode. The electrical resistance of the electrolyte in the inter-electrode gap causes a voltage drop from 1.8 to 2.7 volts, which represents from 40 to 60 percent of the total voltage drop, and is the largest single component of the voltage drop in a given cell.

To reduce the ACD and associated voltage drop, extensive research has been carried out with Refractory Hard Metals or Refractory Hard Materials (RHM) such as $TiB_2$ as cathode materials. $TiB_2$ and other RHM's are practically insoluble in aluminium, have a low electrical resistance, and are wetted by aluminium. This should allow aluminium to be electrolytically deposited directly on an RHM cathode surface, and should avoid the necessity for a deep aluminium pool. Because titanium diboride and similar Refractory Hard Metals are wettable by aluminium, resistant to the corrosive environment of an aluminium production cell, and are good electrical conductors, numerous cell designs utilizing Refractory Hard Metal have been proposed, which would present many advantages, notably including the saying of energy by reducing the ACD.

The use of titanium diboride and other RHM current-conducting elements in electrolytic aluminium production cells is described in U.S. Pat. Nos. 2,915,442, 3,028,324, 3,215,615, 3,314,876, 3,330,756, 3,156,639, 3,274,093 and 3,400,061. Despite extensive efforts and the potential advantages of having surfaces of titanium diboride at the cell cathode bottom, such propositions have not been commercially adopted by the aluminium industry.

The non-acceptance of tiles and other methods of applying layers of $TiB_2$ and other RHM materials on the surface of aluminium production cells is due to their lack of stability in the operating conditions, in addition to their cost. The failure of these materials is associated with penetration of the electrolyte when not perfectly wetted by aluminium, and attack by aluminium because of impurities in the RHM structure. In RHM pieces such as tiles, oxygen impurities tend to segregate along grain boundaries leading to rapid attack by aluminium metal and/or by cryolite. To combat disintegration, it has been proposed to use highly pure $TiB_2$ powder to make materials containing less than 50 ppm oxygen. Such fabrication further increases the cost of the already-expensive materials. No cell utilizing $TiB_2$ tiles as cathode is known to have operated for long periods without loss of adhesion of the tiles, or their disintegration. Other reasons for failure of RHM tiles have been the lack of mechanical strength and resistance to thermal shock.

Various types of $TiB_2$ or RHM layers applied no carbon substrates have failed due to poor adherence and to differences in thermal expansion coefficients between the titanium diboride material and the carbon cathode block.

U.S. Pat. No. 4,093,524 discloses bonding tiles of titanium diboride and other Refractory Hard Metals to a conductive substrate such as graphite. But large differences in thermal expansion coefficients between the RHM tiles and the substrate cause problems.

EP-A 0 164 830 discloses bonding of solid carbide, boride, nitride, silicide and sulfide bodies by laminating a reactant mixture of precursors of the materials of the bodies, then heating to initiate an exothermic reaction producing a layer that bonds the bodies together. However, such methods have not been successfully applied in bonding plates or tiles of $TiB_2$ or like materials to a carbonaceous or other conductive refractory substrates.

SUMMARY OF THE INVENTION

The invention provides a method of bonding bodies of Refractory Hard Material (RHM) or other refractory composites to cathodes or other components of cells of different configurations for the production of aluminium by electrolysis of a molten electrolyte, which cathodes or components are made up of carbonaceous or other electrically conductive refractory materials, usually carbonaceous material. According to the invention, the method comprises placing the RHM or refractory composite bodies onto a cell cathode or other component, with a colloidal slurry comprising particulate preformed RHM in a colloidal-carrier selected from colloidal alumina, colloidal yttria and colloidal ceria in between the bodies and the cathode or other component. The slurry is then dried to bond the bodies to the cathode or other component, the dried slurry acting as a conductive thermally-matched glue which provides excellent bonding of the bodies to the cathode or other component.

Based on adherence tests, it is predicted that such bonded aluminium-wettable cathode bodies should provide a service life of from 5 to 20 years, depending on the cell operating conditions. This is far longer than with any prior method of bonding the bodies to the cathode.

Application of the bodies by means of this non-reactive colloidal slurry is very simple. The formation of an adherent interlayer comprising the pre-formed $TiB_2$ or other refractory composite in the dried colloid ensures an adequate bonding while allowing for thermal expansion when the cell is brought to operating temperature. The excellent adherence is believed to be due to the fact that the bodies of RHM or other refractory composites and the relatively "thick" layers of the dried slurry (usually from about 200 to about 1500 micrometer) have very similar thermal expansion coefficients.

It should be noted that the use of non-reactive colloidal slurries has very suprisingly been found to outperform reactive mixtures which had previously been tried for the same purpose. The reason for this is not known.

The colloidal slurry usually comprises preformed particulate $TiB_2$ in colloidal alumina, and the RHM bodies are made of or comprise $TiB_2$, for instance $TiB_2$—$Al_2O_3$ composites, in particular the reaction products of a mixture of particulate titanium dioxide, boron oxide and aluminium in the molar proportion $3TiO_2 + 3B_2O_3 + 10Al$ mixed with an amount of preformed particulate $TiB_2$.

The colloidal slurry preferably comprises 5-100 g of $TiB_2$ per 10 ml of colloid. The colloidal slurry may further comprise particulate carbon which serves to provide an excellent conductive bond, particularly with carbonaceous cell bottoms.

In one method of application, the colloidal slurry is applied to the surface of the cathode and to the faces of the bodies to be bonded, and the slurry-coated faces of the bodies to be bonded are applied on the slurry-coated face for the cathode.

Alternatively, the colloidal slurry is conveniently applied to the top surface of a cathode formed by a cell bottom, and the faces of the bodies to be bonded are applied on the slurry-coated top surface of the cell cathode bottom, without having to apply a separate layer of the slurry onto the surfaces of the bodies.

The bodies may be tiles, plates, slabs or bricks of the RHM or other refractory composite material, and the slurry may also be applied between adjacent edges of the tiles, plates, slabs or bricks to bond them together.

The bodies to be bonded may be coated on all faces with the slurry so that a layer of the dried slurry is deposited also onto the outer active face of the bodies. Thus, at least one face of the bodies which is not to be bonded to the cathode may be coated with said slurry and/or with a reactive slurry comprising precursors of an RHM or other refractory composite. When a reactive slurry is applied to such faces of the body, these faces will be coated with an RHM-containing coating formed by reaction.

The cell cathode bottom possibly has recesses for receiving parts of the bodies which are bonded in said recesses by the applied slurry.

After application of the slurry and placing of the tiles, plates, slabs or bricks of the RHM or other refractory composite material, the slurry can simply be allowed to dry in the ambient air, possibly assisted by blow heating.

The method is particularly advantageous for carbonaceous cell bottoms which serve as a conductive cell cathode.

The cell cathode bottom may however be coated with a coating containing RHM or other refractory composites onto which the tiles, plates, slabs or bricks of the RHM or RHM composite are placed and bonded by means of the colloidal slurry. This is particularly applicable where a conductive refractory composite material is used as the cell bottom.

Prior to bonding, the RHM or other refractory composite bodies are advantageously aluminized on the face not to be bonded, for instance by placing them in contact with molten aluminium preferably in the presence of a fluxing agent such as a cryolite-alumina flux.

The invention also concerns a cell for the production of aluminium by electrolysis of a cryolite-based molten electrolyte, comprising a cell bottom cathode made of carbonaceous or other electrically conductive refractory material to which are bonded bodies of RHM or other refractory composites. The cell according to the invention is characterized in that the bodies are bonded to the cell bottom cathode by a dried slurry comprising particulate preformed RHM in a colloidal carrier selected from colloidal alumina, colloidal yttria and colloidal ceria. This cell incorporates the various features set out above in discussing its method of production. The invention applies to Hall-Héroult cells of classic design and other aluminium production cells of different configurations including those with deep pool and drained cathode configurations. Thus, bonded bodies of aluminium-wettable refractory materials may be arranged in a drained cell configuration, where molten product aluminium is drained permanently from the bodies. Alternatively, bonded bodies of refractory material are arranged on a cell bottom cathode in a deep or shallow pool of molten aluminium.

The invention applies to the bonding of tiles, plates, slabs or bricks to cell bottoms and also to cathodes placed in other configurations, as well as to the side walls and to other components of the cell such as weirs or baffles associated with the cathodic cell bottom.

The invention concerns mainly bodies of $TiB_2$ or other aluminium-wettable refractory materials which in use will be in contact with the molten product aluminium and/or with the cryolite-based electrolyte. But the invention also contemplates bonding the bodies to carbon pieces, with aluminium between such bodies and a current conductor bar, this aluminium serving to electrically connect the bodies to the conductor bar.

A further aspect of the invention is the use of said cell for the production of aluminium by the electrolysis of alumina dissolved in molten cryolite, where the product aluminium is in contact with said bodies bonded on the cell bottom cathode.

DESCRIPTION OF THE PREFERRED EMBODIMENTS

Figure 1:
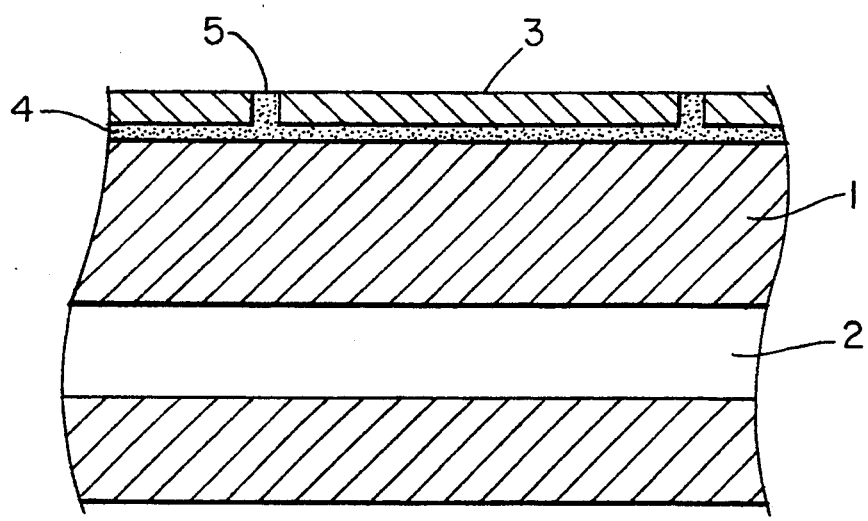
FIG. 1 is a schematic cross-section through part of a cell bottom cathode of an aluminium production cell to which a layer of tiles has been bonded in accordance with the invention.

FIG. 1 shows part of a carbon cell bottom 1 of a cell for the production of aluminium by electrolysis of a molten electrolyte. Current is supplied to the cathodic cell bottom 1 by means of one or more transverse current collector bars 2 made of steel or a suitable alloy. On the top of the cell bottom 1 are bonded tiles 3 of Refractory Hard Material (RHM) composite material, usually a $TiB_2$—$Al2O3$ composite material, made by the method detailed below. The tiles 3 are bonded to the cell bottom 1 by a dried slurry 4 comprising particulate performed RHM in finely divided alumina obtained by applying to the upper surface of the cell bottom 1 and/or to the undersides of tiles 3, a non-reactive colloidal slurry comprising particulate preformed $TiB_2$ in colloidal alumina and allowing the slurry to dry, as explained in greater detail below.

The adjacent edges of the tiles 3 are spaced apart by gaps 5 sufficient to accommodate for thermal expansion of the tiles when the cell is brought to the operating temperature which may be about 950° C. The aforesaid slurry is also applied in these gaps 5, so as to bond together the edges of the tiles 3 while allowing for thermal expansion.

Usually, the layer of the dried slurry 4 is about 200 to about 1500 micrometer thick. The tiles 3 can have any convenient dimensions, usually several millimeters or tens of millimeters thick.

Once the tiles 3 have been bonded onto the cell bottom 1, which involves simple drying at ambient temperature, possibly assisted by blowing hot air using an air gun, the cell can be filled with aluminium and a cryolite-alumina electrolyte and raised to operating temperature by the usual methods.

The bonding of the tiles 3 by the method of the invention resists the thermal stresses during start up. The RHM materials in the tiles 3 ensure excellent wetting of the cell bottom by molten aluminum, which protects the carbon of cell bottom 1 against attack by electrolyte components. Because the tiles 3 remain firmly bonded to the cell bottom 1 for extended periods, despite the aggressive environment, the life of carbon cell bottoms can be extended from the usual 2-3 years to 5-20 years.

Figure 2:
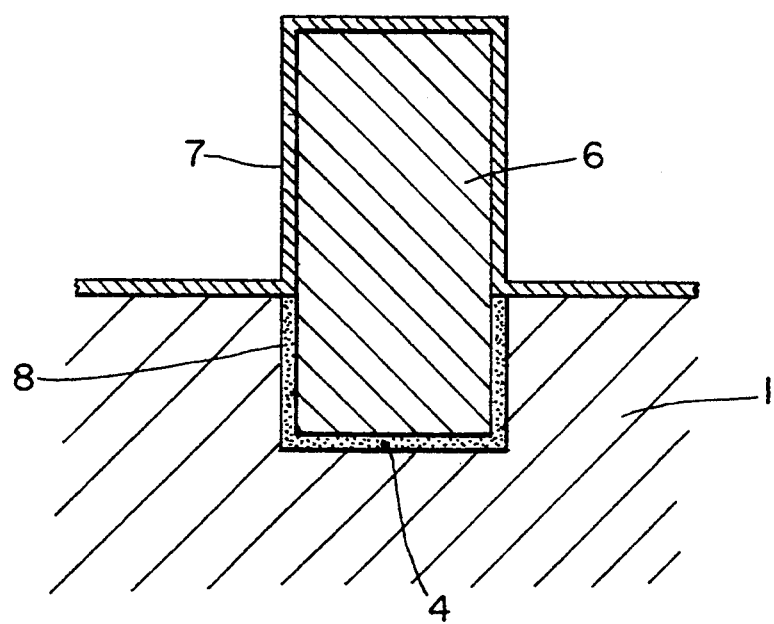
FIG. 2 is a schematic cross-section through part of another cell bottom cathode of an aluminium production cell having slabs bonded in recesses in the cell bottom.

FIG. 2 illustrates another possible cell bottom configuration in which a carbon cell bottom 1 has recesses in the form of rectangular grooves 8 receiving therein rectangular slabs 6 of RHM composite material, usually the $TiB_2$—$Al2O3$ composite material made by the method detailed below, which protrude from the cell bottom 1.

Inside the grooves 8 the bottom parts of the slabs 6 are bonded firmly by a dried slurry 4 comprising particulate preformed RHM in finely divided alumina. As before, this dried slurry is obtained by applying to the insides of grooves 8 and/or to the underneath parts of slabs 6, a non-reactive colloidal slurry comprising particulate preformed $TiB_2$ in colloidal alumina and allowing the slurry to dry.

The flat upper surface of the carbon cell bottom 1 and the protruding upper part of the slabs 6 are coated with a layer 7 containing RHM obtained from a colloidal slurry of reactants, as explained above. Alternatively, it is possible to utilize protruding slabs or other shapes of carbonaceous material having the flat upper surface, or any surface in contact with the cryolite electrolyte, covered with RHM tiles.

When this cell is in operation, the protruding parts of slabs 6 act as drained cathodes from which the product aluminium flows down onto the aluminium-wettable layer 7 on the cell bottom. Of course, FIG. 2 merely schematically shows one type of drained cathode configuration. Many other cell designs and configurations can use the described non-reactive slurry bonding technique.

The invention will be further described in the following laboratory-scale examples.

Plates (and other shapes) of $TiB_2$ composite materials were prepared by mixing together particulate reactants in the molar ratio $3TiO_2 + 3B_2O_3 + 10Al$ together with a selected amount of particulate preformed $TiB_2$. The $TiO_2$ was 99% pure (metals basis; Johnson Matthey, Catalog Number 11396) with a particle size of 1.5 to 2.0 micrometer. The $B_2O_3$ was obtained from Messrs Fischer, Catalog Number A76-3. The aluminium was $-100$ mesh or $-325$ mesh 99.5% pure, from Johnson Matthey. The $TiB_2$ was from Johnson Matthey, Catalog Number 11364.

The powders were mixed and blended for 15 to 30 minutes. Preferably the reaction powders and $TiB_2$ are mixed In a weight ratio of about 50:50, but this ratio can range from 90:10 to 30:70, usually in the range 40:60 to 60:40. The mixed powders are then vibration poured into a die, without segregation during pouring.

The die is pressed at 35 Ksi (=5.43 K/cm$^2$) for 5 minutes. For large plates, a load release and repressing operation may be used, or the load application may be gently increased over three minutes. Optimal pressing conditions can be determined for each shape and size being manufactured. After ejection from the die, the pressed plate or other shape should not have any cracks.

The plates are then combusted, for example with a torch in a $CO_2$ atmosphere, or in a furnace under controlled atmosphere. Prior to firing, very light refractory bricks are placed below and above the plates in order to minimize distorsion during firing.

After firing, the surface is examined for color and for any melting of the refractory. Any skin formed by melting should be removed by machining.

Next, the plates are aluminized, on their face which is to be in contact with molten aluminium and which is not to be bonded, by contact of this face with molten aluminium in the presence of a cryolite-alumina flux, as follows. Aluminium chunks are loaded into a crucible and placed in a furnace at 1000° C. until the aluminium has melted. The crucible is removed from the furnace and the plate inserted into the molten aluminium. Premixed powders of cryolite and alumina 90/10% by weight are then spread on top of the melt.

The crucible is placed back in the furnace at 1000° C. for 3 to 24 hours, as long as is necessary to aluminize the plate surface to the required degree. Longer times are preferable; shorter times will provide a less complete aluminization than for longer times. The required amount of aluminization will depend on whether the plate is to be used as cathode in configurations where it is exposed to cryolite, where fuller aluminization is desirable.

The plate is then removed from the melt. Examination of the surface shows that the surface contains aluminium and has slightly increased in thickness. The aluminized surfaces are shiny and well wettable by molten aluminium.

The plates were then bonded by their nonaluminized face to a carbon block forming the cathode of a laboratory aluminium production cell as follows.

A slurry was prepared from a dispersion of 10 g $TiB_2$, 99.5% pure, $-325$ mesh ($<42$ micrometer), in 25 ml of colloidal alumina containing about 20 weight % of solid alumina. Coatings with a thickness of $150\pm50$ to $500\pm50$ micrometer were applied to the faces of the plates and of the carbon blocks to be applied together. Just after the slurry was applied, and while still tacky, the slurry-coated faces of the plates were applied on the slurry-coated blocks and allowed to dry for about 30 minutes.

The above procedure was repeated varying the amount of $TiB_2$ in the slurry from 5 to 15 g and varying the amount of colloidal alumina from 10 ml to 40 ml. Coatings were applied as before. Drying took 10 to 60 minutes depending on the dilution of the slurry and the thickness of the coatings.

In a further series of tests, a sub-layer of the slurries was applied to each surface and dried or partly dried before applying the next coating. The two parts were applied together while the last coating was still tacky.

In all cases, after drying the plates adhered strongly to the carbon blocks. The thermal cycle resistance of the bonded plates/blocks was tested by placing them in a furnace at 900° C. for several minutes, then removing them, allowing them to cool in air, and reinserting them in the furnace. This operation was repeated five times. All of the tiles remained adherent to the blocks after this thermal cycling treatment.

Several of the blocks were tested as cathodes in a laboratory aluminium production cell with the bonded plates in a drained-cathode configuration. The cells operated at low cell voltage and the plates remained adherent after long periods of electrolysis without showing any sign of delamination.

In a variation of the invention, the same bonding technique can be used to bond together pieces of carbonaceous materials.

I claim:

1. In a cell for production of aluminum by electrolysis of a cryolite-based molten electrolyte, comprising a cathode or other component, including a cell bottom cathode, made of carbonaceous or other electrically conductive refractory material, to which are bonded bodies of Refractory Hard Material (RHM) or aluminum wettable refractory materials, an improvement wherein said bodies are bonded onto the cathode or other component by a dried slurry comprising particulate preformed RHM in a colloidal carrier, said carrier being selected from the group consisting of colloidal alumina, colloidal yttria, colloidal ceria and mixtures thereof.

2. The improvement of claim 1, wherein the dried slurry comprises preformed particulate $TiB_2$ in finely-divided alumina obtained from colloidal alumina.

3. The improvement of claim 1, wherein the RHM bodies comprise $TiB_2$.

4. The improvement of claim 3, wherein the RHM bodies are $TiB_2$—$Al_2O_3$ composites.

5. The improvement of claim 4, wherein the RHM bodies are reaction products of a mixture of particulate titanium dioxide, boron oxide and aluminum in a molar proportion of $3TiO_2+3B_2O_3+10Al$ mixed with an amount of preformed particulate $TiB_2$.

6. The improvement of claim 1, wherein the dried slurry further comprises particulate carbon.

7. The cell of claim 1, wherein the dried slurry is derived from a slurry comprising 5–100 g of $TiB_2$ per 10 ml of colloid.

8. The improvement of claim 1, wherein the bonded bodies are tiles, plates, slabs or bricks of the RHM or aluminium wettable material having facing edges which are also bonded together by said dried slurry.

9. The improvement of claim 1, wherein at least one face of the bodies which is not to be bonded to the cathode or other component is coated with said dried slurry, with a reactive slurry comprising precursors of said RHM or with a mixture thereof.

10. The improvement of claim 1, wherein the bodies are bonded to the cell bottom comprising recesses receiving parts of the bodies which are bonded in said recesses by the dried slurry.

11. The improvement of claim 1, wherein the cathode or other component is carbonaceous.

12. The improvement of claim 1, wherein the cathode or component is coated with a coating containing RHM onto which said bodies are bonded.

13. The improvement of claim 9, wherein surfaces of the RHM that are not bonded to the cathode or other component are aluminized.

14. The improvement of claim 1, wherein the bonded bodies of refractory material are aluminium wettable and are arranged in a drained cell configuration.

15. The improvement of claim 1, wherein the bonded bodies of refractory material are arranged on the cell bottom cathode in a pool of molten aluminium.

16. Use of the cell of claim 1 for the production of aluminium by the electrolysis of alumina dissolved in a cryolite-based molten electrolyte, where the product aluminium is in contact with said bodies bonded on the cathode or other component.

* * * * *